United States Patent
Emerson et al.

(10) Patent No.: US 7,577,877 B2
(45) Date of Patent: Aug. 18, 2009

(54) MECHANISMS TO PREVENT UNDESIRABLE BUS BEHAVIOR

(75) Inventors: Theodore F. Emerson, Tomball, TX (US); Phyllis L. Bongain, Spring, TX (US); Cesar Buentello, Rosenberg, TX (US); Jennifer C. Kleiman, Houston, TX (US); Doron Chosnek, Houston, TX (US); Robert L. Noonan, Crystal Lake, IL (US); David F. Heinrich, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1356 days.

(21) Appl. No.: 10/444,154

(22) Filed: May 22, 2003

(65) Prior Publication Data

US 2005/0060468 A1   Mar. 17, 2005

(51) Int. Cl.
*G06F 11/00* (2006.01)
(52) U.S. Cl. .............................. 714/43; 714/44; 710/15; 710/17; 710/18
(58) Field of Classification Search .................... 714/43
See application file for complete search history.

(56) References Cited

U.S. PATENT DOCUMENTS

| | | | | |
|---|---|---|---|---|
| 5,712,967 A | * | 1/1998 | Grossman et al. ............... | 714/3 |
| 5,815,647 A | * | 9/1998 | Buckland et al. ............... | 714/3 |
| 6,000,043 A | * | 12/1999 | Abramson ..................... | 714/44 |
| 6,625,761 B1 | * | 9/2003 | Sartore et al. ................. | 714/43 |
| 2002/0194548 A1 | * | 12/2002 | Tetreault ...................... | 714/43 |

OTHER PUBLICATIONS

PCI Special Interest Group, "PCI Local Bus Specification," Production Version, Revision 2.0, Apr. 30, 1993 (48 p., double-sided).

* cited by examiner

*Primary Examiner*—Yolanda L Wilson

(57) ABSTRACT

A system includes proxy logic which detects situations which, unless action is taken, would result in undesirable bus behavior. In one embodiment, the target device of a bus cycle includes proxy logic which determines when the target device is unable to respond correctly to a bus cycle. In this situation, the proxy logic blocks a bus signal from being received by the addressed logic in the target device, thereby preventing the target device from responding at all. In another embodiment, proxy logic is located external to the target device and determines when the target device has not responded to a cycle intended for it. When this condition has occurred, the proxy logic responds to the cycle before the bus's subtractive decode agent has a chance to claim the cycle. The proxy logic's response may be to return bogus data or terminate or abort the cycle.

30 Claims, 2 Drawing Sheets

MECHANISMS TO PREVENT UNDESIRABLE BUS BEHAVIOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to preventing undesirable behavior on a computer bus. More particularly, the invention relates to the use of proxy logic to detect the onset of a condition which, if undetected, would lead to undesirable bus behavior and to prevent the undesirable behavior from occurring.

2. Background Information

As is commonly known, computers include central processing units ("CPUs"), memory, bridge logic devices, and other types of devices all generally coupled together via one or more busses. A bus comprises collection of individual data, address and control signals which coordinate the efficient transmission of commands and responses through the computer. Various electronic devices connect to a bus over which they send and receive messages. To avoid confusion, each bus device typically is assigned a unique address to permit messages, packets, etc. to be sent to specific device(s). Bridge logic can be used to connect together two or more busses to permit the system to be scaled as desired.

On many busses, operation typically entails one entity on the bus (called the "master") initiating a transaction to another entity on the bus by transmitting a request containing the address of the target device. Although all of the devices may receive the request, only the intended recipient successfully decodes the address as its own and "claims" the cycle. Once the target claims the cycle, the cycle is permitted to run. The cycle might be a read request in which the master requests data from the target, a write request by which the master provides new data to the target, a configuration cycle, etc.

Several situations can lead to undesirable bus behavior. These situations have been observed on a Peripheral Component Interconnect ("PCI") bus, although the problems may not be unique to PCI busses. Before these situations are discussed, a brief overview of the operation of the PCI bus is provided. When a master desires to initiate a cycle on a PCI bus, the master asserts a PCI bus signal called FRAME# (where the symbol # that indicates the signal is considered asserted in a low logic state). The master also places the address of the intended target and the command type on the PCI bus's address/data and command/byte enable lines. Of all of the devices on the bus, only the target with the matching address claims the cycle as its own. The target claims the cycle by asserting another PCI signal called DEVSEL# which indicates to the master that the target device has correctly decoded the address.

The PCI specification permits four types of decode possibilities. A "fast" decode is when the target device decodes the request and asserts DEVSEL# to claim the cycle one clock cycle after the address and command is presented. In a "medium" decode condition, the target device asserts DEVSEL# two clocks after the address and command is presented. A "slow" decode occurs when the target asserts DEVSEL# three clocks after the address and command is presented. Finally, the PCI specification suggests having one device on the bus being designated to act as a "subtractive" decode agent which will assert DEVSEL# on the fourth clock cycle after the address and command are presented if no other device has already claimed the cycle via a fast, medium or slow decode. The subtractive decode agent may not be the intended target, but claims the cycle nonetheless to ensure proper operation of the bus. Once a target device claims the cycle, the cycle completes in various ways consistent with the PCI specification.

As noted above, several situations can lead to undesirable bus behavior. For instance, some bus devices occasionally may be unable to respond properly. For example, a PCI add-in card may contain its own logic that, at times, may be in a state that prevents the card from responding correctly to a PCI cycle. That is, the card may respond to an attempted PCI cycle, but not do so in full compliance with the PCI specification. In one scenario, it has been observed that a PCI target device on a card correctly decoded the address on the bus as its own and responded by asserting DEVSEL. However, the PCI target device subsequently failed to terminate the cycle properly thereby causing the cycle to hang up, effectively locking the bus. This occurred when, for example, the host computer system placed the PCI target device into an initialization or test mode of which the add-in card was unaware.

Another situation may occur when the intended target device has been transitioned to a non-responsive mode of operation. This may occur when the host CPU has disabled the controller from responding at all to a PCI bus cycle. Some systems have a second processor. For example, in some server applications, the system includes a management processor which, among other things, permits a user at a remotely located console to interact with the server to configure the server and check its status. Some systems have been designed so that the management processor functions generally autonomously from the host server's CPU, thereby permitting a remote console to access logic on the server even if the server's main CPU is non-operational. For example, if a PCI bus device is a video graphics controller which contains data to be displayed, the management processor can access the card's display data in the card's memory even when the server's CPU is in a non-functional state. For various reasons (simplicity, cost, space limitations, etc.), the management processor may be connected to the same PCI bus as the server's main CPU. As such, the management processor shares the infrastructure resources of the server with the main CPU.

The autonomous nature of the management processor means that the management processor may be unaware that the main CPU has disabled a PCI bus device (e.g., the graphics card). Thus, the management processor may issue a cycle to a PCI device bus device that is incapable of responding without being aware that the device cannot respond. If the intended recipient of the PCI bus cycle is unable to respond at all within the fast, medium or slow decode time periods, the bus's subtractive decode agent will claim the cycle. The subtractive decode agent may comprise a bridge logic device which bridges the primary PCI bus to other bus's and logic. The subtractive decode agent further may attempt to pass the cycle it has now claimed on to its subordinate busses/logic. The subtractive decode agent also may request the management processor to retry the cycle at a later time, thereby giving the subtractive decode agent sufficient time to process the cycle. While the subtractive decode agent is processing the cycle, the server's CPU may enable the previously disabled intended target. Then, the next time the management processor retries the PCI bus cycle, the true intended target will claim the cycle. At that point, both the intended target and the subtractive decode agent have claimed the same cycle. This condition is known as bus "contention" and can lead to unpredictable bus behavior, and therefore unpredictable system behavior.

Accordingly, a solution to these problems of improper bus behavior is needed.

BRIEF SUMMARY OF THE INVENTION

The problems noted above are solved in large part by a system comprising "proxy" logic that addresses the problems noted above. In one embodiment, the system includes proxy logic which determines when the target device is unable to respond correctly to a bus cycle. When this condition is met (which may be when the target device is being initialized or is in a test mode), the proxy logic blocks an appropriate signal to the logic device that is being addressed by the current cycle. The signal selected to be blocked is a signal that preferably initiates the cycle. In the context of a PCI bus, the signal may be the FRAME# signal. By blocking the FRAME# signal, the addressed logic device does not attempt to respond at all to the cycle and thus does not respond in an incorrect manner which otherwise might have locked up the PCI bus.

In accordance with another embodiment of the invention, other embodiment of proxy logic is provided external to the target device but also coupled to the PCI bus to which the target device is coupled. The proxy logic monitors the bus to determine if the target device responds to an intended cycle within a specified time period. If that time period has expired and the target device has not claimed the cycle, the proxy logic responds to the cycle. The time period preferably is shorter than the time period that would cause the bus's subtractive decode agent to claim the cycle. Thus, the proxy logic responds to the cycle once it is sure the intended target has not responded but before the subtractive decode agent has a chance to claim the cycle. In this embodiment, the proxy logic preferably responds by aborting the cycle. Alternatively, the proxy logic may simply respond to the cycle, providing the initiator with a "placebo" data transaction which will satisfy the protocol requirements of the connecting bus. In this case, the proxy logic may signal the master to disregard this data since it has been provided by the proxy logic on behalf of the problematic target device and therefore may not be accurate. Further still, the proxy logic may retry the cycle.

With these embodiments, the bus lock-up and contention problems noted above are avoided. These and other benefits will be appreciated upon reviewing the following disclosure and accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "proxy" is not intended to impart any meaning beyond that explicitly stated herein. The word "proxy" is used simply to provide a convenient way to refer to the logic described below.

DETAILED DESCRIPTION OF THE PREFERRED EMBODIMENTS

Figure 1:
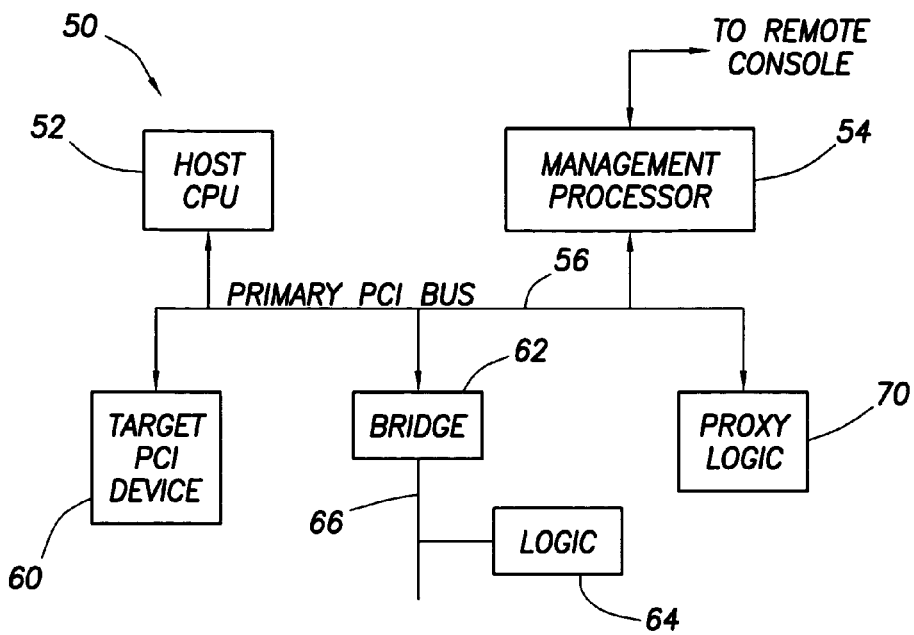
FIG. 1 shows a block diagram of a preferred embodiment of a system including proxy logic to solve the problem of a target bus device being unable to respond to a cycle.

Referring now to FIG. 1, computer system 50 in accordance with the preferred embodiment comprises a host CPU 52 and a management processor 54 coupled to a common bus 56. Bus 56 preferably is a PCI bus, although this disclosure is not limited to that particular type of bus. Other logic may be included in system 50, such as a PCI device 60, bridge logic 62 and proxy logic 70. For purposes of the following discussion, PCI bus cycles will be described intended for PCI device 60, hence it will be called the "target" PCI device. The target PCI device may be a graphics card or any other type of logic desired. Bridge 62 bridges the PCI bus 56 (referred to as the "primary" PCI bus) to other logic devices (e.g., logic device 64) coupled to the bridge 62 via a bus 66. Bus 66 may be another PCI bus, an I2C bus, a Low Pin Count ("LPC") bus, or any other type of suitable bus.

A remote console (not specifically shown) can access system 50 via the management processor 54. The management processor 54 permits a remote console to access the system generally without involvement of the host CPU 52. For example, the management processor 54 is able to access the target PCI device 60, bridge device 62 and proxy logic 70 over the primary PCI bus 56, without CPU 52 involvement. In fact, the host CPU 52 can be non-operational (e.g., in a failed or hung state) and the management processor 54 may still access the devices 60, 62, and 70.

Figure 2:
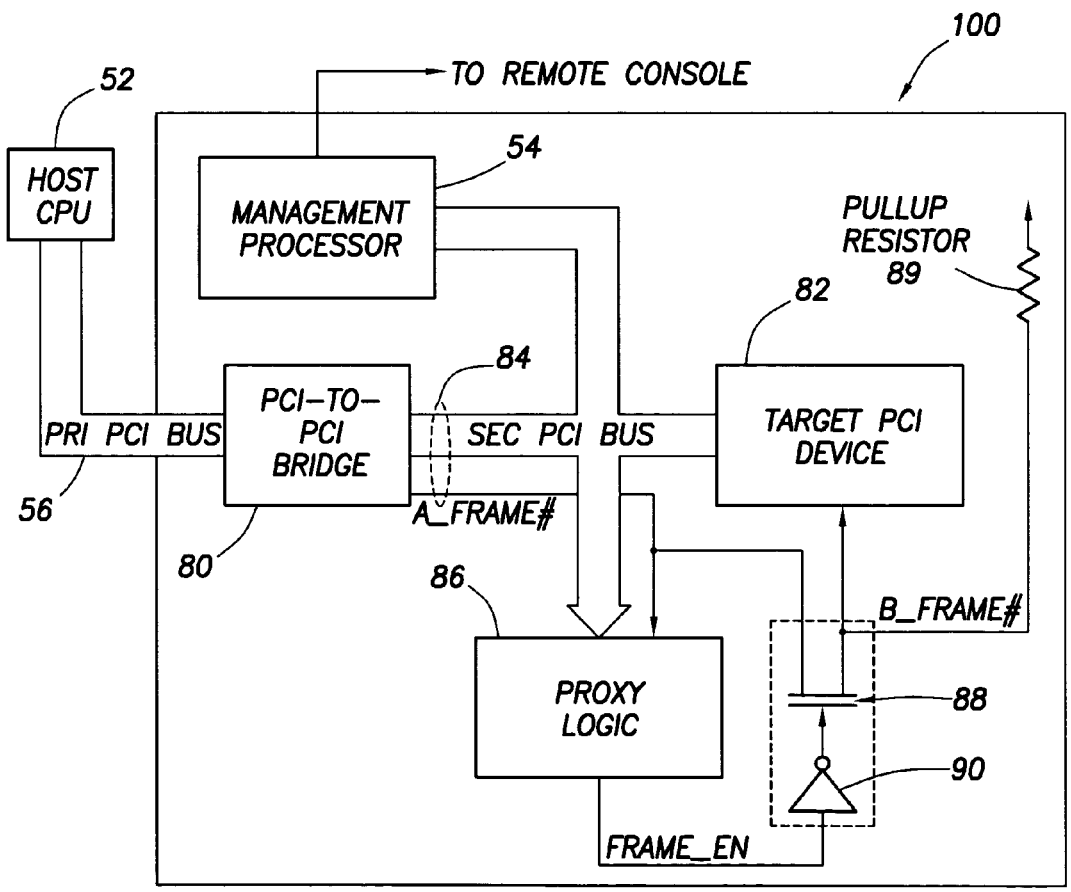
FIG. 2 shows a block diagram of a preferred embodiment of the target device having proxy logic to solve the problem of the target device being unable to respond correctly to a bus cycle.

As discussed previously, a PCI bus device (e.g., target PCI device 60) may be in a mode of operation which temporarily precludes it from responding correctly to a PCI cycle. In accordance with the preferred embodiment of the invention, the target device 60 includes logic to avoid this problem from occurring. Referring now to FIG. 2, a PCI subsystem 100 may include a management processor 54, a PCI-to-PCI bridge 80, a target PCI device 82, proxy logic 86, a switch 88 and inverter 90. Other logic may be included as well. The PCI subsystem 100 may be included in the embodiment of FIG. 1. The PCI subsystem 100 may include a secondary PCI bus 84 which couples to the target PCI device 82. The bridge 80 bridges together the primary PCI bus 56 and the secondary PCI bus 84. The management processor 54 may be a PCI device coupled to the secondary PCI bus 84. Both the host CPU 52 and management processor 54 may initiate PCI cycles to the target or addressed device 82. That is, the address contained in the PCI cycle is the address of device 82.

The proxy logic 86 preferably determines when the addressed device 82 is the intended recipient of a PCI cycle and blocks that cycle from being claimed by the device if the device is otherwise unable to correctly respond to the cycle as would be well known by one of ordinary skill in the art. One of the standard PCI bus signals is the FRAME# signal and must be asserted by a PCI cycle initiator to begin a PCI cycle. Referring still to FIG. 2 and in accordance with a preferred embodiment of the invention, the FRAME# signal is blocked from being passed to the addressed device 82 if the device 82 is unable to correctly respond. Proxy logic 86, which may comprise a plurality of transistors in the form of a programmable array logic ("PAL") device, performs the function of determining when the addressed device 82 is in a mode which would prevent it from correctly responding to a PCI cycle and then preventing the attempted cycle from reaching the addressed device 82. The proxy logic 86 may snoop accesses to the addressed device 82 to correctly determine its state. The proxy logic 86 also examines PCI cycles intended for the addressed 82 device, examining the originator (master) of the cycle, the type of cycle, and whether the address of the cycle would result in a "hung" bus. These conditions may be based on the known behavior of the addressed device 82. When all of these conditions are met, the proxy logic 86 may block an outstanding cycle from reaching its intended target (addressed device 82). If the bus segment does not contain a subtractive decode agent (e.g., bridge device 62 of FIG. 1), the PCI cycle may be terminated by the master when no PCI device responds by asserting DEVSEL# to the outstanding request. For bus segments which do contain a subtractive decode agent, the proxy logic 86 preferably claims and terminates the cycle.

One condition that may prevent the addressed device 82 from correctly responding to a PCI cycle from the primary PCI bus 56 is when the host CPU 52 has placed the addressed device 82 in a self-test mode. When the device is in a test mode, various bits in one or more registers (not specifically shown) in the addressed device 82 may be changed. Thus, the proxy logic may snoop the secondary PCI bus 84 to determine when the host CPU 52 transitions the addressed device 82 to a test mode. Other conditions which may be detected in the addressed device 82 may include software generated resets, configuration and/or mode changes. In any particular condition, the addressed device 82 may be able to respond to certain cycles but not others. (e.g., the addressed device 82 may respond to the PCI bus cycles required to restore it to normal operating mode). In such cases, the proxy logic 86 allows these cycles to pass while blocking problematic ones.

During normal operation (i.e., the addressed device 82 is able to respond to a PCI cycle), the primary PCI bus signals from bus 56 pass through bridge 80 to the secondary PCI bus 84 to the addressed device 82. The FRAME# signal, however, is not provided directly to the addressed device 82. Instead, the FRAME# signal (shown in FIG. 2 as the A_FRAME# signal) is provided to the proxy logic 86. The A_FRAME# signal is also connected to an analog switch 88 which also provides the FRAME# signal to addressed device 82 as a signal called "B_FRAME #." The switch 88 preferably comprises a field effect transistor ("FET") which is enabled and disabled by the FRAME_EN signal. The FRAME_EN signal is controlled by the proxy logic 86. The enable signal is inverted by inverter 90 to make it compatible with FET switch 88. When the proxy logic 86 determines that the addressed device 82 is able to respond to a PCI cycle, the proxy logic asserts the FRAME_EN signal (logic low). After being inverted by inverter 90, the asserted FRAME_EN signal causes the FET switch 88 to close thereby providing the A_FRAME# signal to the addressed device 82 as B_FRAME#.

As explained above, the addressed device 82 may be in a non-operating mode preventing it from responding correctly to a PCI cycle. The proxy logic 86 snoops accesses to critical registers in the addressed device 82 to determine when the device is in this state. When the proxy logic 86 determines that device 82 is in a test mode, or is otherwise unable to correctly respond to a PCI cycle, the proxy logic deasserts the FRAME_EN signal to inverter 90 when proxy logic 86 detects an asserted A_FRAME# signal. A deasserted FRAME_EN signal maintains FET switch 88 in an "open" state thereby preventing the B_FRAME# signal from being provided to the addressed device 82. As such, the addressed device 82 does not respond to an attempted PCI cycle because the FRAME# signal is blocked. Upon detection of a non-operating mode, the proxy logic 82 may generate an interrupt (not shown) to the management processor 54 to notify it that the addressed device 82 is in an "unstable" state in which the device may not respond to certain types of cycles (e.g., accesses to a memory buffer attached to the addressed device). The management processor 54 may then temporarily terminate accesses to the addressed device 82. Additionally, the management processor 54 may poll registers in the proxy logic 86 and/or the addressed device 82 to determine when the addressed device 82 is restored to a fully operational state.

Figure 3:
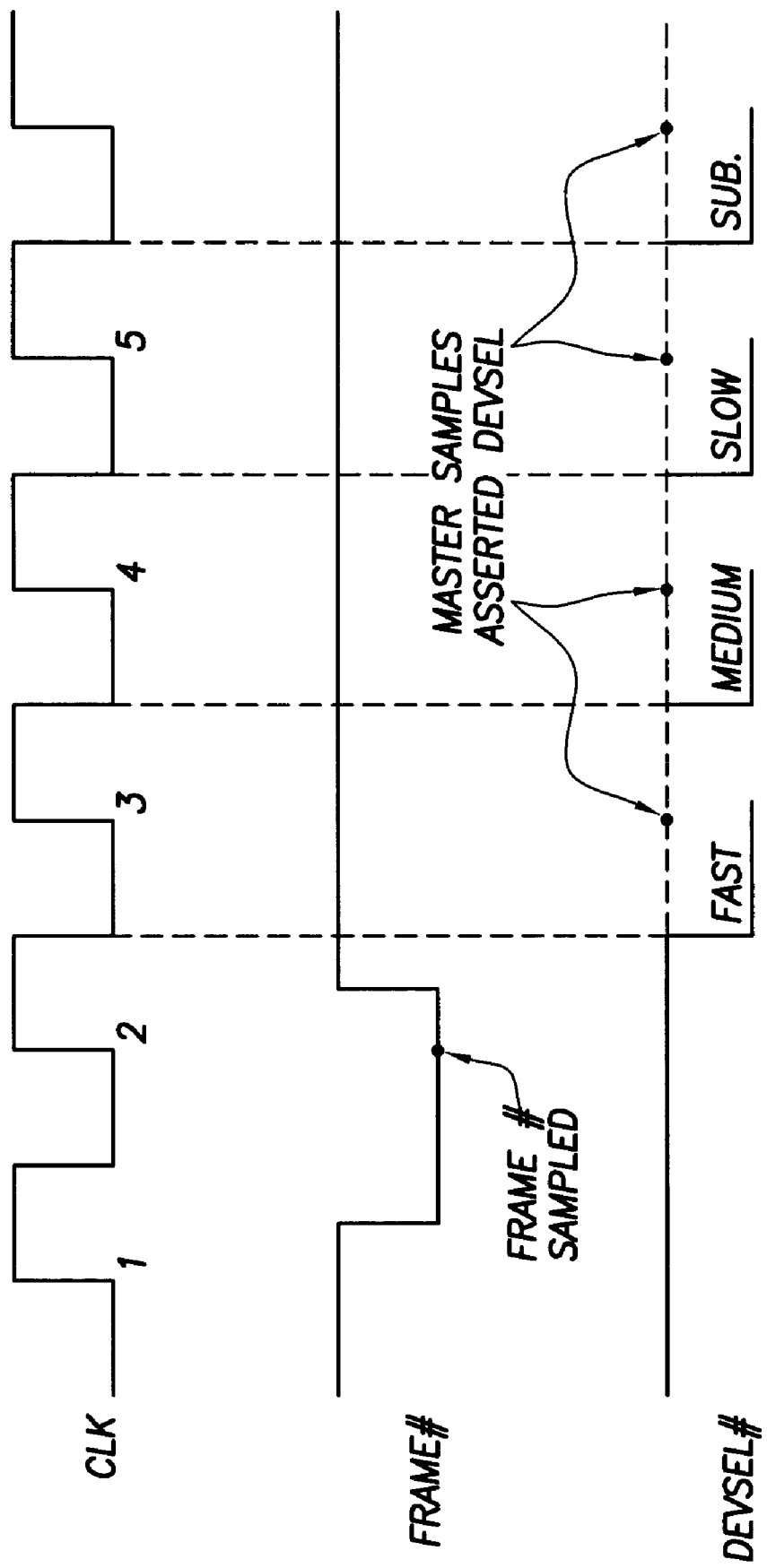
FIG. 3 shows a timing diagram of various bus signals in accordance with the operation of the proxy logic of FIG. 1.

Referring again to FIG. 1, as explained previously, there may situations in which the target PCI device 60 cannot respond at all to an attempted PCI cycle (e.g., initiated by management cycle 54). Referring briefly to the timing diagram of FIG. 3, CLK, FRAME# and DEVSEL# signals are shown. As noted previously, a device may implement fast decoding by asserting DEVSEL# one clock after FRAME# is asserted as shown. Medium, slow, and subtractive decode timing is also shown in FIG. 3. If the target of a PCI cycle does not assert DEVSEL# in either the fast, medium or slow decode time periods, the subtractive decode agent claims the cycle by asserting DEVSEL# in the subtractive decode time period. In the embodiment shown in FIG. 1, the bridge 62 preferably comprises the subtractive decode agent. Those skilled in the art will appreciate that the above description describes a bus cycle where FRAME# assertion is coincident with a valid read or write bus command. The PCI specification 2.2 describes how a master may address devices using a 64-bit or dual-address cycle. Those skilled in the art will appreciate that the presence of a dual-address cycle in the transaction will delay the assertion of DEVSEL# from the falling assertion of FRAME# by one additional clock.

Referring to FIG. 1, in accordance with a preferred embodiment of the invention, the proxy logic 70 monitors the primary PCI bus 56 for the assertion of the bus's FRAME# signal with a valid read or write command on command/byte enable signals, which marks the begins of a cycle. As was the case for proxy logic 86, proxy logic 70 preferably comprises a PAL. The proxy logic 70 also determines whether the target address of the cycle corresponds to the target PCI device 60. The proxy logic thus determines when a cycle has been attempted to the target device 60. In accordance with the preferred embodiment, the target PCI device 60 is implemented with either fast or medium decode logic. The proxy logic 70 then waits for the target device 60 to claim the cycle by asserting DEVSEL# in either the fast or medium decode time slots. If the proxy logic 70 does not detect an asserted DEVSEL# in either the fast or medium decode time slots, the proxy logic 70 responds to the cycle before the bridge 62 claims the cycle as the subtractive device agent.

The proxy logic 70 preferably responds to the attempted cycle to the unavailable target device 60 in one of several ways. One way generally includes responding to the cycle with "placebo" data. This technique is appropriate when the attempted PCI cycles comprise read cycles to the target device 60. This will be the case when the target device 60, for example, is a graphics card and the management device is attempting to read the graphics data from the card's memory so as to provide such graphics data to a remote console for viewing thereon. The placebo data provided by the proxy logic 70 will be processed as legitimate data by the management console and remote console. The placebo data preferably comprises any value or set of values that is benign in nature (i.e., will not cause any processing or transmission errors). The placebo data may cause the remote console to display a useless pattern on the screen, but this is unlikely to cause a problem and perhaps may not even be noticed. This latter point may be true because when the intended PCI cycle target device 60 becomes available, it will begin to claim all subsequent PCI cycles intended for it, thereby providing legitimate data. If the remote console had been painting its screen with placebo data from the proxy logic 70, the true target 60 will now begin providing legitimate data, which will overwrite the incorrect screen data on the remote console.

Another technique that can be employed by the proxy logic 70 to respond to a PCI cycle when the intended target 60 is unavailable is to cause the cycle to be terminated or aborted. The management processor 54 will, of course, detect the premature end of the cycle. The management processor 54 may retry the cycle which again will be ended prematurely by the proxy logic 70 if the intended target 60 fails to assert DEVSEL in the fast or medium decode time periods. This process may repeat itself until the target device 60 becomes able to claim the cycle. Alternatively, the management processor 54 may determine that the target device 60 is unable to respond after receiving a predetermined number of cycle terminations/aborts. The predetermined number may be one or more.

The proxy logic 70 can accomplish the cycle termination or abort in one of several ways in accordance with the PCI specification. A target-abort can be initiated by the proxy logic 70 by asserting the well known PCI bus signal STOP# while de-asserting DEVSEL#. In this way, the proxy logic 70 requires the cycle to be terminated and does not want the transaction to be retried. Alternatively, the proxy logic 70 may permit the management processor to retry the cycle. This is accomplished by asserting the STOP# signal while also asserting DEVSEL#. At the same time, the proxy logic 70 also does not assert the "target ready" signal ("TRDY#") which also is a well known PCI bus signal. The TRDY# signal normally indicates that the target is ready to complete the current data phase of the transaction. This combination of signals (asserted STOP# and DEVSEL# and deasserted TRDY#) indicates the proxy logic's desire to terminate the cycle, but have the management processor 54 retry the cycle at a later time. Two other forms of target initiated termination are also possible and within the scope of this disclosure. Both forms supply data (preferably placebo data) to the master. In one form, data is transferred by the proxy logic 70, but the proxy logic signals to the master that it wishes to disconnect or stop the transaction. In this form, the proxy logic 70 asserts the TRDY# and STOP# bus signals while continuing to assert DEVSEL#. The assertion of TRDY# signifies that data (preferably placebo data) is transferred but instructs the bus master to terminate the transaction by the next data phase. In another form, the proxy logic 70 supplies the master with placebo data until the master terminates the transaction. In this form, the proxy logic 70 asserts TRDY# while holding DEVSEL# asserted until one clock after the master de-asserts the FRAME# signal. The proxy logic thus satisfies the master with placebo data and satisfies the protocol requirements of the bus. Those skilled in the art will appreciate that signaling a data transfer (TRDY# asserted) may require the proxy logic to drive correct parity on the bus or the system must be instructed to ignore parity for these cycles. The transaction types mentioned above are further described in Chapter 3 of the PCI Local Bus Specification, Revision 2.2, Dec. 18, 1998, incorporated herein by reference.

In general, it should be noted that the proxy logic 70 performs at least two tasks. One task is to claim the cycle by asserting DEVSEL before the subtractive decode agent claims the cycle. In this way, the proxy logic 70 "owns" the cycle. The second task is to respond to the cycle, as noted above. This may include aborting the cycle, retrying the cycle or supplying placebo data.

The preferred embodiments described above provide various techniques for preventing inappropriate bus behavior due to a target device being unable to respond or unable to respond correctly to a bus cycle. The preferred embodiments generally include the use of proxy logic to detect such situations and prevent them from happening.

The above discussion is meant to be illustrative of the principles and various embodiments of the present invention. Numerous variations and modifications will become apparent to those skilled in the art once the above disclosure is fully appreciated. For example, the scope of this disclosure is not limited to PCI busses in particular. It is intended that the following claims be interpreted to embrace all such variations and modifications.

What is claimed is:

1. A system, comprising:
    host logic;
    a target device that is addressed by said host logic;
    proxy logic coupled to said host logic and said target device, said proxy logic blocks a host logic-originating cycle from the target device when said target device is unable to respond correctly to the cycle, but before a decode agent claims the cycle.

2. The system of claim 1 wherein said cycle is provided over a bus and said bus includes a control signal which is asserted to initiate a cycle, and said proxy logic blocks said control signal from being asserted to said target device when said target device is unable to respond correctly to the cycle.

3. The system of claim 2 further including a transistor coupling said proxy logic to said target device, wherein said control signal is provided through said transistor and said transistor is turned on and off by an enable signal controlled by said proxy logic.

4. The system of claim 3 wherein the host logic, target device and proxy are coupled together via a PCI bus and said control signal comprises a FRAME# signal.

5. The system of claim 2 wherein the host logic, target device and proxy are coupled together via a PCI bus and said control signal comprises a FRAME# signal.

6. The system of claim 2 wherein said proxy logic snoops accesses to said target device to determine the target device's mode of operation and blocks the cycle if said mode of operation is a mode that prevents the target device from correctly responding to the cycle.

7. The system of claim 1 wherein said proxy logic snoops accesses to said target device to determine the target device's mode of operation and blocks the cycle if said mode of operation is a mode that prevents the target device from correctly responding to the cycle.

8. Proxy logic adapted to couple to a host and a target device that is addressed by said host, said proxy logic comprising transistors coupled together that block a host-originating cycle from the target device when said target device is unable to respond correctly to the cycle but before a decode agent claims the cycle.

9. The logic of claim 8 wherein said cycle is provided over a bus and said bus includes a control signal which is asserted to initiate a cycle, and said proxy logic blocks said control signal from being asserted to said target device when said target device is unable to respond correctly to the cycle.

10. The logic of claim 9 wherein said proxy logic controls a signal to enable the control signal to be asserted to said target device if said target device is able to respond correctly to the cycle or to disable the control signal from being asserted to the target device if said target device is not able to respond correctly to the cycle.

11. The logic of claim 10 wherein the proxy logic is adapted to couple to the host and target device via a PCI bus and said control signal comprises a FRAME# signal.

12. The logic of claim 9 wherein the proxy logic is adapted to couple to the host and target device via a PCI bus and said control signal comprises a FRAME# signal.

13. The logic of claim 8 wherein said proxy logic is adapted to snoop accesses to a register in the target device to determine the target device's mode of operation and blocks the cycle if said mode of operation is a mode that prevents the target device from correctly responding to the cycle.

14. A method of ensuring proper bus behavior, comprising:
(a) determining whether a target device is capable of responding correctly to a bus cycle;
(b) detecting a bus cycle intended for the target device; and
(c) if the target device is not capable of responding correctly to the bus cycle, blocking the cycle from the target device before a decode agent claims the cycle.

15. The method of claim 14 wherein (c) includes preventing a bus control signal from being asserted to the target device, the control signal normally used to initiate a bus cycle.

16. The method of claim 15 wherein the bus cycle comprises a PCI bus cycle and said control signal comprises a FRAME# signal.

17. A system, comprising:
a first electronic device;
a second electronic device;
a target device coupled to said first and second electronic devices and to which either of said first or second electronic devices can issue cycles;
a decode agent coupled to said first and second electronic devices, said decode agent claims a cycle intended for the target device if the target device does not claim the cycle by a predetermined period of time; and
proxy logic coupled to said first and second electronic devices, said proxy logic claims the cycles intended for the target device if the target device does not claim the cycles, but before the decode agent claims the cycles.

18. The system of claim 17 wherein the cycles claimed by said proxy logic originate only from the second electronic device.

19. The system of claim 18 wherein said proxy logic claims the cycles and responds to the second electronic device with predetermined data.

20. A system, comprising:
a first electronic device;
a second electronic device;
a target device coupled to said first and second electronic devices and to which either of said first or second electronic devices can issue cycles;
a decode agent coupled to said first and second electronic devices, said decode agent claims a cycle intended for the target device if the target device does not claim the cycle by a predetermined period of time; and
proxy logic coupled to said first and second electronic devices, said proxy logic aborts cycles intended for the target device if the target device does not claim the cycles, but before the decode agent claims the cycles.

21. The system of claim 20 wherein the cycles aborted by said proxy logic originate only from the second electronic device.

22. Proxy logic adapted to couple to a cycle originating bus device, a target bus device, and a decode agent, said decode agent normally claiming cycles that are unclaimed by the intended targets of cycles, said proxy logic comprises transistors coupled together that determine whether a cycle transmitted by the cycle originating bus device to the target bus device has been claimed by the target bus device, and if the target bus device fails to claim the cycle, said proxy logic claims the cycle before the decode agent claims the cycle and responds with placebo data.

23. Proxy logic adapted to couple to a cycle originating bus device, a target bus device, and a decode agent, said decode agent normally claiming cycles that are unclaimed by the intended targets of cycles, said proxy logic comprises transistors coupled together that determine whether a cycle transmitted by the cycle originating bus device to the target bus device has been claimed by the target bus device, and if the target bus device fails to claim the cycle, said proxy logic claims the cycle before the decode agent claims the cycle and then said proxy logic aborts the cycle.

24. A method of ensuring proper behavior of a bus coupled to a plurality of bus devices, comprising:
(a) determining whether a cycle intended for a target bus device has been claimed by the target bus device; and
(b) a proxy logic bus device other than the target bus device claiming the cycle before a decode agent claims the cycle, the decode agent normally claiming cycles that go unclaimed by the intended targets of the cycles; and
(c) said proxy logic bus device providing predetermined data to an originator of the cycle.

25. A method of ensuring proper behavior of a bus coupled to a plurality of bus devices, comprising:
(a) determining whether a cycle intended for a target bus device has been claimed by the target bus device; and
(b) a proxy logic bus device other than the target bus device claiming the cycle before a decode agent claims the cycle and then aborting the cycle, wherein the decode agent normally claiming cycles that go unclaimed by the intended targets of the cycles.

26. A system, comprising:
host logic;
a target device that is addressed by said host logic;
a means for determining whether the target device is able to respond correctly to a cycle from the host logic; and
a means for blocking the cycle from the target device when said target device is unable to respond correctly to the cycle and before a decode agent claims the cycle.

27. A system, comprising:
a first electronic device;
a second electronic device;
a target device coupled to said first and second electronic devices and to which either of said first or second electronic devices can issue cycles;
a decode agent coupled to said first and second electronic devices, said decode agent claims a cycle intended for the target device if the target device does not claim the cycle by a predetermined period of time; and a means for responding to a cycle intended for the target device if the target device does not claim the cycle, but before the decode agent claims the cycle.

28. The system of claim 27 wherein said means for responding includes a means for aborting the cycle.

29. The system of claim 27 wherein said means for responding includes a means for claiming the cycle and providing predetermined response data.

30. The system of claim 27 wherein said means retries the cycle.

* * * * *